United States Patent [19]
Vorstenbosch

[11] Patent Number: 5,875,904
[45] Date of Patent: *Mar. 2, 1999

[54] BOX-LIKE TRANSPORT CONTAINER

[76] Inventor: Albertus Franciscus Vorstenbosch, Nieuwe Sluisplein 11, Heenvliet, Netherlands, NL-3218 VP

[ * ] Notice: This patent issued on a continued prosecution application filed under 37 CFR 1.53(d), and is subject to the twenty year patent term provisions of 35 U.S.C. 154(a)(2).

[21] Appl. No.: 637,776

[22] PCT Filed: Nov. 1, 1994

[86] PCT No.: PCT/NL94/00266

§ 371 Date: Jun. 27, 1996

§ 102(e) Date: Jun. 27, 1996

[87] PCT Pub. No.: WO95/12513

PCT Pub. Date: May 11, 1995

[30] Foreign Application Priority Data

Nov. 5, 1993 [NL] Netherlands .......................... 9301930

[51] Int. Cl.⁶ ....................................... A47F 5/00
[52] U.S. Cl. ...................... 211/180; 211/184; 280/47.35; 280/79.3
[58] Field of Search ................ 280/47.35, 79.3; 211/180, 184, 94, 94.5, 151, 162, 191; 160/245

[56] References Cited

U.S. PATENT DOCUMENTS

| | | |
|---|---|---|
| 359,691 | 3/1887 | Reed ...................................... 211/180 |
| 373,447 | 11/1887 | Ely ........................................... 211/180 |
| 486,459 | 11/1892 | Gerhard ................................... 211/180 |
| 832,625 | 10/1906 | Ryan ........................................ 211/180 |
| 942,580 | 12/1909 | McGregor et al. ...................... 211/180 |
| 1,733,214 | 10/1929 | Alexander et al. ...................... 211/180 |
| 1,925,815 | 9/1933 | Nicolson ................................. 160/245 |
| 4,948,154 | 8/1990 | Guggenheim ........................... 211/180 |
| 5,131,450 | 7/1992 | Lichy . |
| 5,199,729 | 4/1993 | Sievert et al. . |
| 5,626,241 | 5/1997 | Holden ................................... 211/180 |

FOREIGN PATENT DOCUMENTS

| | | |
|---|---|---|
| 0008769 | 3/1980 | European Pat. Off. . |
| 2075836 | 10/1971 | France . |
| 2523834 | 9/1983 | France . |
| 2052663 | 1/1981 | United Kingdom . |

*Primary Examiner*—Karen M. Young
*Assistant Examiner*—Douglas Hess
*Attorney, Agent, or Firm*—Webb Ziesenheim Bruening Logsdon Orkin & Hanson, P.C.

[57] ABSTRACT

The invention refers to a box-like transport container having at least one partially open side and a flexible covering element movable between an opened and a closed position. The box-like transport container preferably has a flexible covering element that in an opened position of the container is located close to an upright. In a preferred embodiment the flexible covering element can be rolled up or folded up.

20 Claims, 6 Drawing Sheets

BOX-LIKE TRANSPORT CONTAINER

BACKGROUND OF THE INVENTION

The invention relates to a box-like transport container.

In the transport of vulnerable or sensitive products in an existing box-like transport container it is often desired to cover off one or more open sides of the box-like transport container which may be present. An example hereof is the protecting of open roller containers for transport of plants and/or flowers. The protecting of such a transport container takes place by wrapping it with a plastic wrapping foil. Such a screening protects the contents of the transport container in the desired way. The arranging of the wrapping foil prior to transport and removal of the wrapping foil after transport has taken place are labour-intensive. The wrapping foil is damaged during removal such that it is only suitable for once-only use. The removed wrapping foil has an adverse impact on the environment.

The object of the present invention is to provide an improved box-like transport container with at least one in any case partially open side, the contents of which can be screened off and made accessible again in simple manner and wherein further the screening material is reusable.

SUMMARY OF THE INVENTION

The present invention provides for this purpose a box-like transport container having at least one in any case partially open side and flexible covering means movable between an opened and a closed position. The flexible covering means movable between the opened and the closed position enable simple screening and re-accessing of the contents of the transport container and can furthermore be used a number of times.

A preferred embodiment of the box-like transport container is characterized in that in a closed position the flexible covering means are located close to an upright When anchored in a closed position the flexible covering means can engage on an upright in simple manner such that the flexible covering means are tensioned.

The flexible covering means can in preference be rolled up or folded up. If the flexible covering means can be rolled or folded up they will take up only little space in an opened position.

In preference the flexible covering means further stand under bias. The bias makes it possible to move the flexible covering means in simple manner from one to another position.

The box-like transport container is preferably characterized in that the flexible covering means are movable horizontally or vertically. The flexible covering means are preferably moistureproof and manufactured from material capable of accepting print. Such a material is for instance "Tyvek" from Dupont. These steps enable transport container applications for a wide diversity of products and under varying conditions.

BRIEF DESCRIPTION OF THE DRAWINGS

The invention will be further elucidated with reference to the non-limitative embodiment of the transport container shown in the following figures, wherein.

DESCRIPTION OF THE PREFERRED EMBODIMENTS

Figure 1:
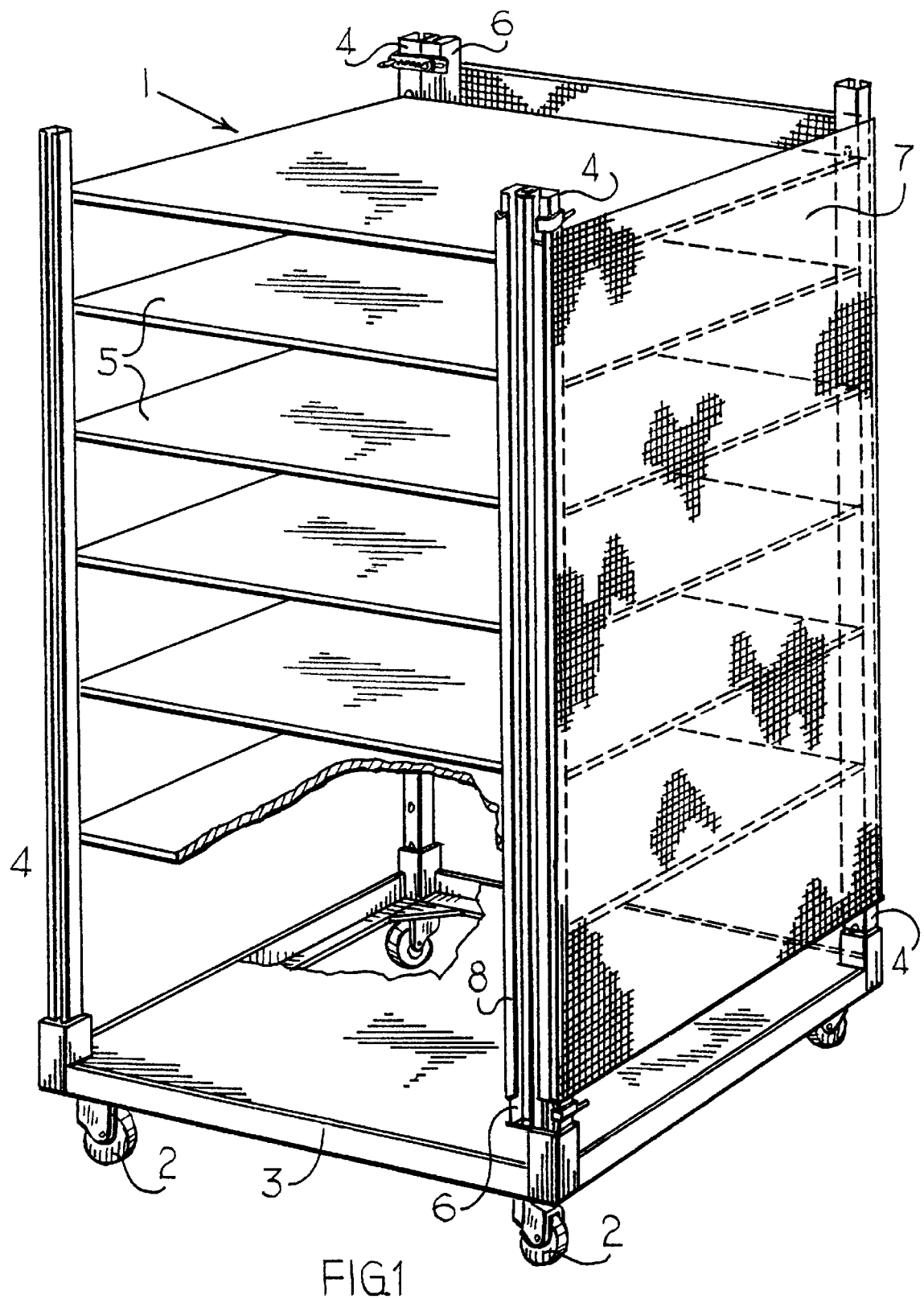
FIG. 1 shows a perspective view of a partly cut away transport container with two roll-up protective screens, one in open and one in closed position.

A box-like transport container 1 as shown in FIG. 1 consists of a base tray 3 which is provided with wheels 2 and in which are inserted detachable uprights 4. Shelves 5 for carrying products (not shown) are fixed between the uprights 4. Fixed to two of the uprights 4 are tubular profiles 6 in which is received a roll-up mechanism which is not visible in this figure. A one screen 7 covers two of the sides of transport container 1, that is, screen 7 is shown in the closed position. A second screen 8 is shown in an opened or rolled-up position.

Figure 2:
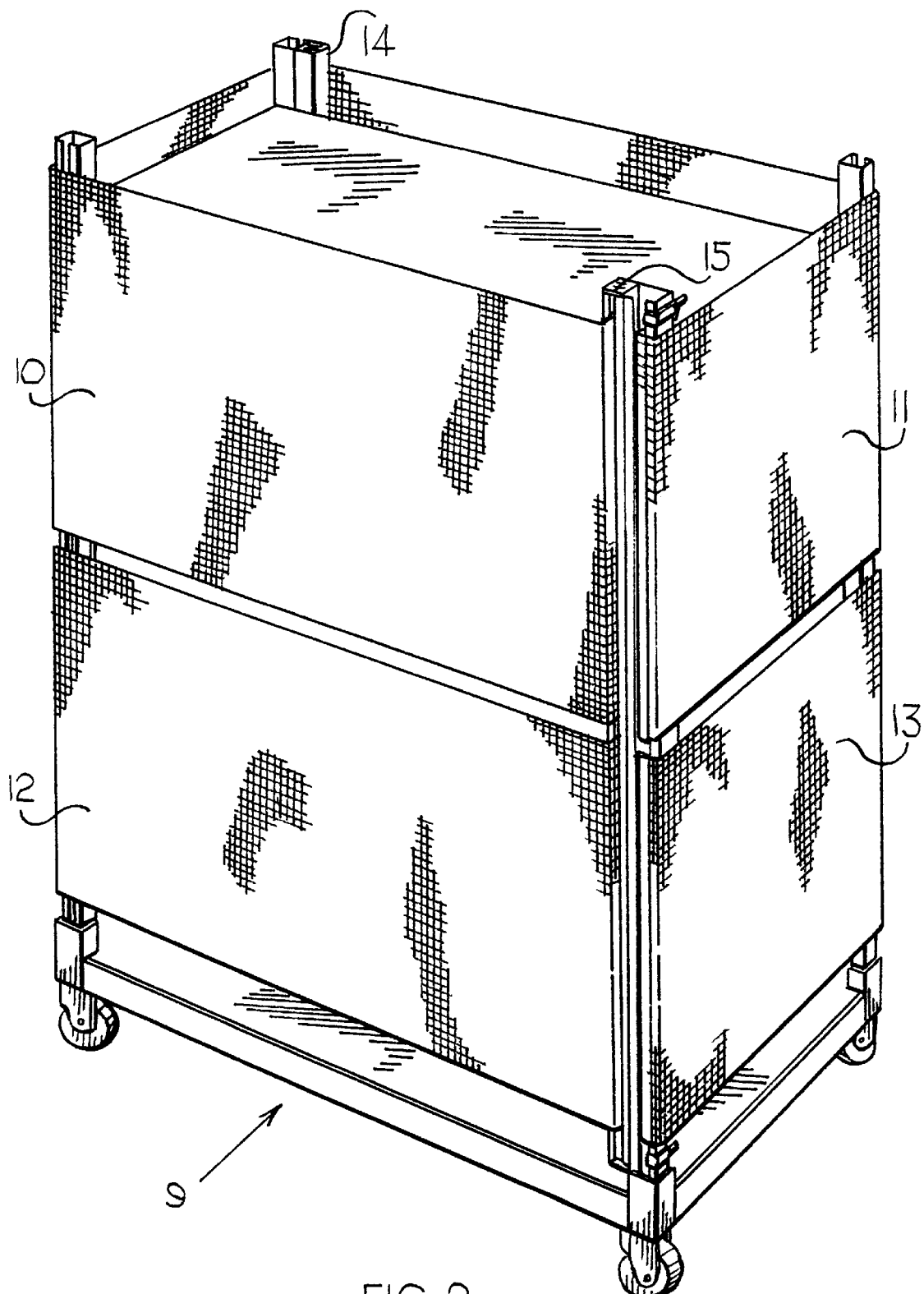
FIG. 2 is a perspective view of a box-like transport container with four closed roll-up protective screens.

FIG. 2 shows a box-like transport container 9 with four closed screens 10, 11, 12, 13. The tubular profiles 14, 15 accommodating roll-up mechanisms for the screens 10, 11, 12, 13 are mounted on diagonally opposing uprights 4. Screens 10, 12 are fixed to a roll-up mechanism received in the tubular profile 14 and screens 11, 13 are fixed to a roll-up mechanism received in tubular profile 15. Like screens 11, 13, the screens 10, 12 can be opened and closed independently of each other. An advantage of the transport container as shown in this figure is that a part of a side only can be covered or not covered. The material from which the screens 10, 11, 12, 13 is manufactured is preferably so thin that a fully rolled-up screen 10, 11, 12, 13 can be accommodated in a tubular profile 14, 15. The screen material will have to meet particular requirements depending on the application of the screen. Applications in a moist or wet environment are for instance conceivable wherein the screen material must be moistureproof, while other properties of the material are also conceivable, such as being light-transmitting or, conversely, non-transparent, air permeable, capable of accepting print, etc. The special material properties of the screen can give the screens additional functions. An example here is the provision of the screens with advertising messages.

Figure 3:
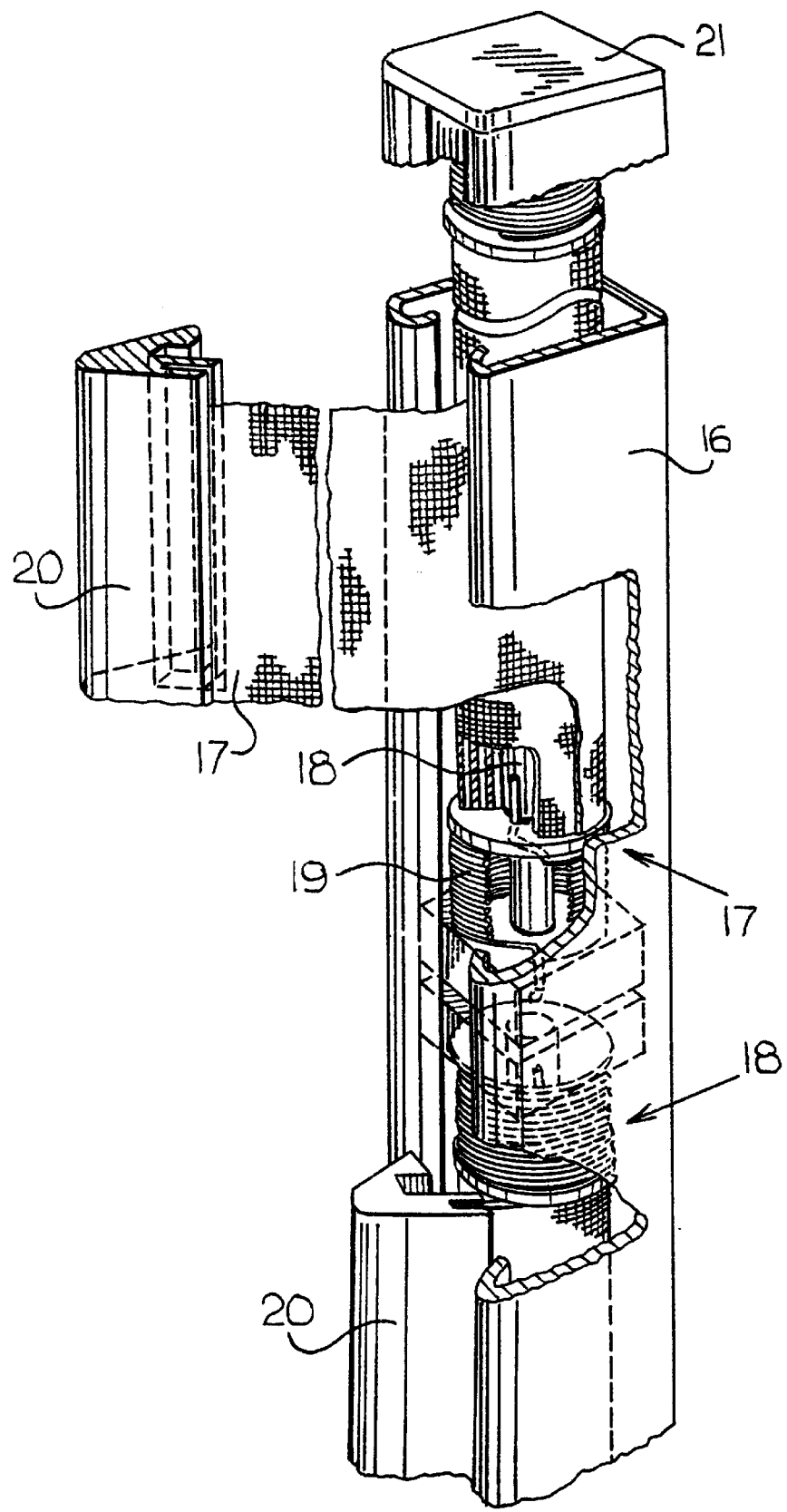
FIG. 3 shows a perspective view of a partly cut away roll-up mechanism for two protective screens.

FIG. 3 shows a tubular profile 16 in which are arranged two roll-up mechanisms 17, 18 controllable independently of each other. The screen 17 is rolled onto a core 18. The screen stands under a bias in the direction of the rolled-up situation by means of a spring 19. Such a bias can of course also be arranged in a different manner. The outer end of screen 17 is provided with a strip 20 which prevents the screen 17 disappearing completely into the tubular profile 16 and with which it is further possible to fix screen 17 to an upright of the transport container. The top and bottom of the tubular profile 16 are provided with a stop 21 to prevent the contents of the tubular profile 16 from becoming dirty.

Figure 4:
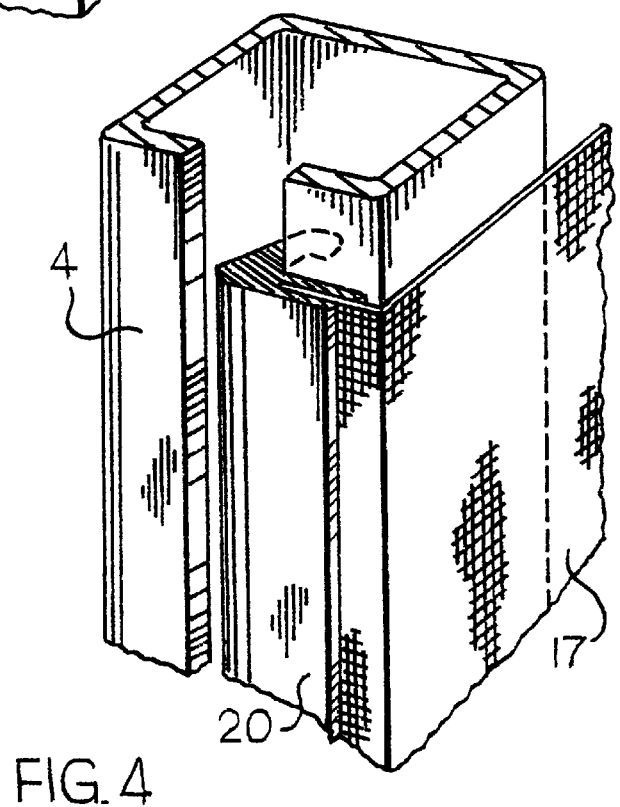
FIG. 4 is a perspective view of a mounting to an upright of an at least partly closed protective screen.

FIG. 4 shows the strip 20 of FIG. 3 in a closed position of screen 17. Strip 20 engages on the upright 4 of the transport container (not shown here).

Figure 5:
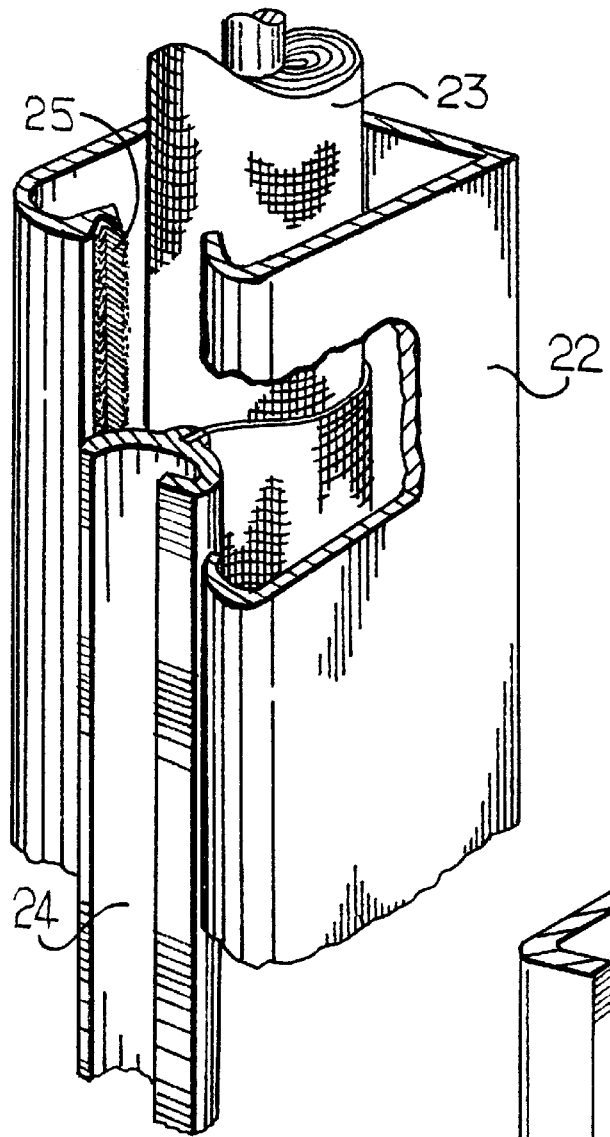
FIG. 5 is a perspective view of a rolled-up protective screen.

FIG. 5 shows a screen 23 received in a tubular profile 22 and having an alternatively embodied strip 24. The tubular profile 22 is provided with brushes 25 to remove during rolling up of the screen 23 any dirt which may adhere to the screen 23. The strip 24 is formed such is that when screen 23 is in the rolled-up state the strip 24 does not protrude outside the periphery of tubular profile 22.

Figure 6:
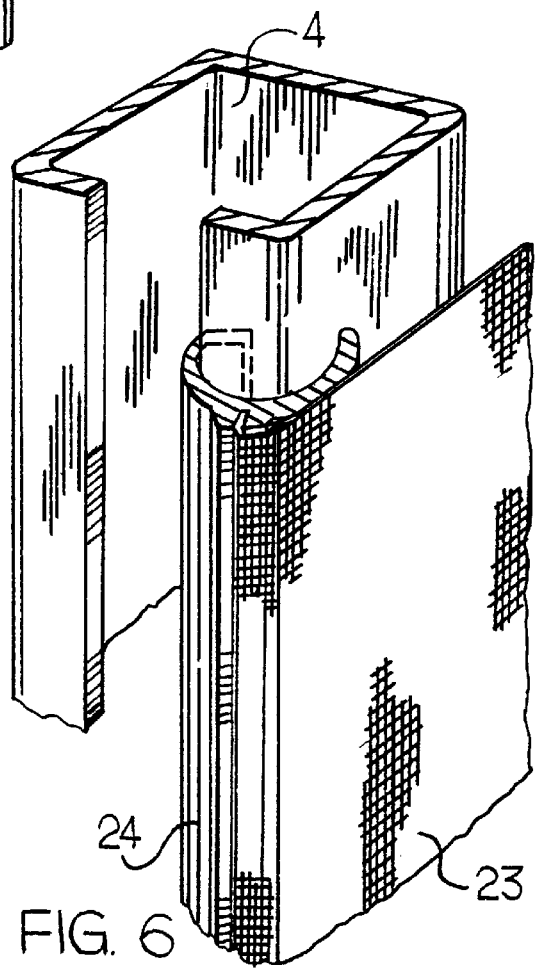
FIG. 6 is a perspective view of an alternative mounting to an upright of an at least partly closed protective screen.
Figure 8:
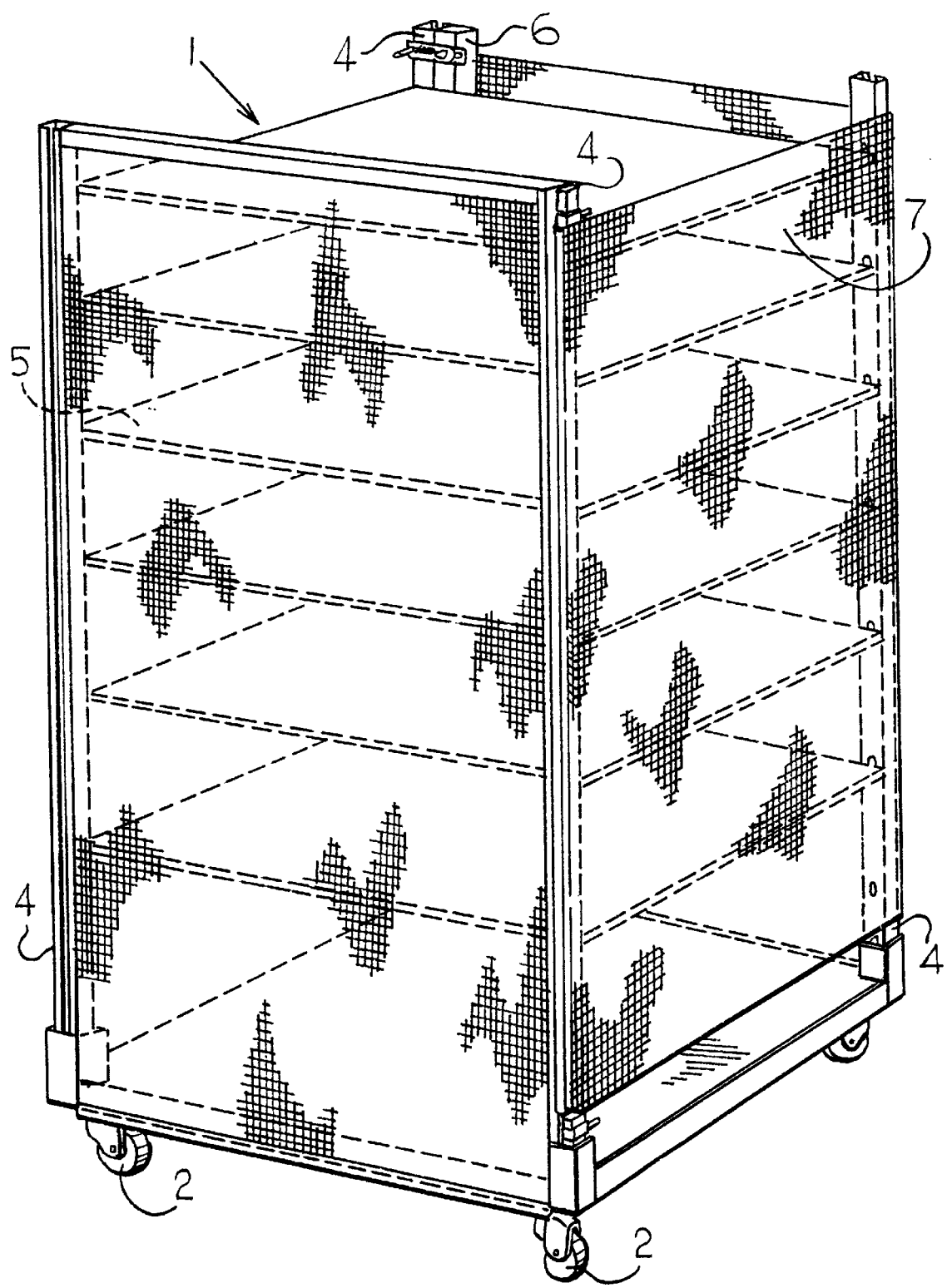
FIG. 8 is a perspective view of a transport container with a vertically movable roll-up protective screen in a closed position.

FIG. 6 shows the strip 24 of FIG. 5 in the closed state of screen 23. Strip 24 herein engages on an upright 4 of the transport container (not shown).

Figure 7:
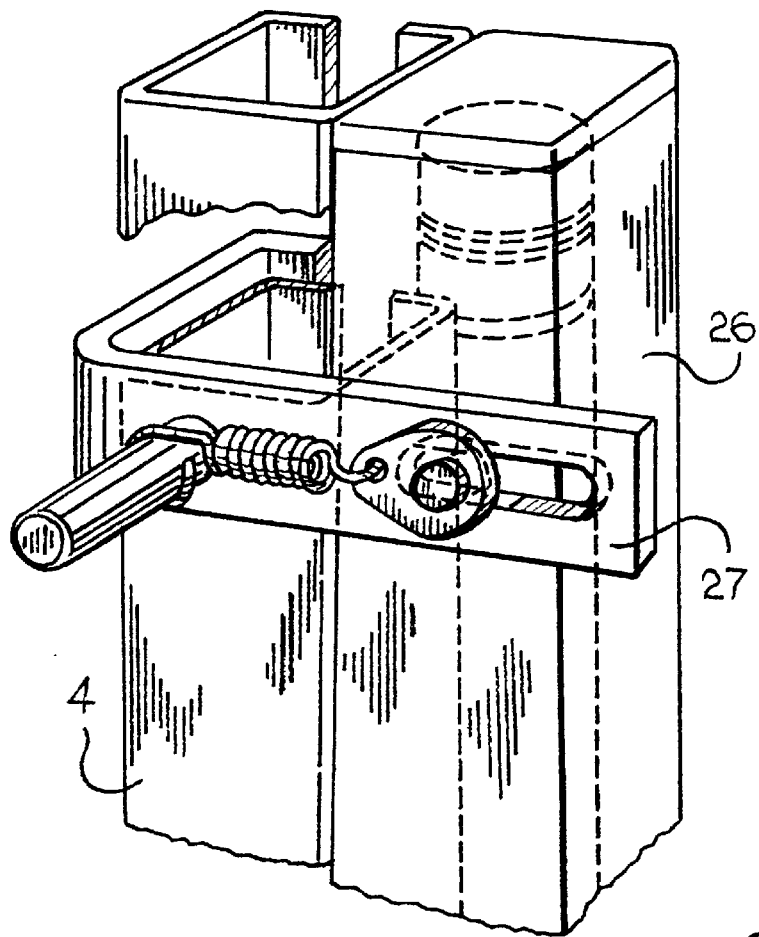
FIG. 7 is a perspective view of a mounting of a roll-up mechanism of a protective screen to a partly cut away upright.

FIG. 7 shows a bracket 27 which is fixed to the outside of a tubular profile 26 and with which the tubular profile 26 can be mounted detachably to an upright 4 of the transport container.

I claim:

1. A box-like transport container, comprising:
    a base;
    a plurality of uprights detachably mounted to said base, wherein said uprights extend substantially perpendicular to said base;
    a roll-up mechanism attached to at least one of said uprights;
    a flexible covering means extendably carried on said roll-up mechanism and movable between an opened position in which at least one open side of said container is not covered by said covering means and a closed position in which said at least one open side of said container is covered by said covering means; and
    a spring biasing said flexible covering means toward the opened position,
    wherein said flexible covering means is configured to cover at least two adjacent open sides of said container in the closed position.

2. A box-like transport container as claimed in claim 1, further including a strip connected to an outer end of said flexible covering means and configured to engage said uprights, and wherein with said flexible covering means in the closed position, said strip is in engagement with one of said uprights and maintains said flexible covering means in the closed position.

3. A box-like transport container as claimed in claim 2, wherein said flexible covering means is configured to be rolled up by said roll-up mechanism.

4. A box-like transport container as claimed in claim 2, wherein said flexible covering means is horizontally movable.

5. A box-like transport container as claimed in claim 4, wherein said flexible covering means is configured to be rolled up by said roll-up mechanism.

6. A box-like transport container as claimed in claim 2, wherein said flexible covering means is moistureproof.

7. A box-like transport container as claimed in claim 2, wherein said flexible covering means comprises material configured to accept print.

8. A box-like transport container as claimed in claim 2, wherein said flexible covering means is made of TYVEK.

9. A box-like transport container as claimed in claim 2, wherein said roll-up mechanism includes brushes for removing dirt adhering to said flexible covering means while moving to and from the closed position.

10. A box-like transport container as claimed in claim 1, wherein said flexible covering means is made of TYVEK.

11. A box-like transport container as claimed in claim 1, wherein said flexible covering means is horizontally movable.

12. A box-like transport container as claimed in claim 11, wherein said flexible covering means is configured to be rolled up by said roll-up mechanism.

13. A box-like transport container as claimed in claim 1, wherein said flexible covering means is configured to be rolled up by said roll-up mechanism.

14. A box-like transport container as claimed in claim 1, wherein said flexible covering means is moistureproof.

15. A box-like transport container as claimed in claim 1, wherein said flexible covering means comprises material configured to accept print.

16. A box-like transport container as claimed in claim 1, wherein said roll-up mechanism includes brushes for removing dirt adhering to said flexible covering means while moving to and from the closed position.

17. A box-like transport container, comprising:
    a base;
    a plurality of uprights detachably mounted to said base, wherein said uprights extend substantially perpendicular to said base;
    at least one tubular profile removably attached to one of said uprights, said tubular profile having brushes extending along a longitudinal length of said tubular profile;
    a roll-up mechanism carried in said tubular profile; and
    a spring biased screen extendably carried on said roll-up mechanism, said screen having an outer end with a strip attached thereto,
    wherein said screen is movable between a first position in which said screen is wound around said roll-up mechanism to a second position in which said screen extends from said tubular profile and covers at least one open side of said container, and said screen is configured to cover at least two adjacent open sides of said container in the second position,
    wherein said strip is configured to engage another of said uprights and maintain said screen in the second position, and
    wherein said brushes remove dirt adhering to the screen while moving to and from the second position.

18. A box-like transport container as claimed in claim 17, wherein said flexible covering means is moistureproof.

19. A box-like transport container as claimed in claim 17, wherein said flexible covering means comprises material configured to accept print.

20. A box-like transport container as claimed in claim 17, wherein said flexible covering means is made of TYVEK.

* * * * *